United States Patent [19]

Anderson et al.

[11] Patent Number: 5,497,713

[45] Date of Patent: Mar. 12, 1996

[54] GARDEN SEEDER

[76] Inventors: Jesse L. Anderson, 6272 Highway 45 South, Meridian, Miss. 39301; Joe S. Sodoma, P.O. Box 181, Meridian, Miss. 38301

[21] Appl. No.: 296,483

[22] Filed: Aug. 26, 1994

[51] Int. Cl.⁶ ..................................... A01C 5/02
[52] U.S. Cl. ............................. 111/92; 222/361; 222/288; 111/7.1
[58] Field of Search ............................. 111/106, 7.1, 7.2, 111/92, 94–99, 170; 222/344, 345, 361, 288

[56] References Cited

U.S. PATENT DOCUMENTS

| | | | |
|---|---|---|---|
| 315 | 7/1855 | Malone | 111/92 |
| 15,114 | 6/1856 | Atkins | 111/98 |
| 18,148 | 9/1857 | Hughes | 111/92 |
| 589,386 | 8/1897 | Gerhard | 222/361 |
| 1,094,595 | 4/1914 | Riordan . | |
| 1,182,913 | 5/1916 | Kollenberg . | |
| 1,367,916 | 2/1921 | McKeig | 222/361 |
| 1,409,009 | 3/1922 | Julien | 222/361 |
| 1,439,601 | 12/1922 | Boop | 111/92 |
| 1,584,878 | 5/1926 | McQuarrie | 222/288 |
| 1,610,767 | 12/1926 | Gourlay . | |
| 2,865,315 | 12/1958 | Goldstein | 111/92 |
| 3,097,759 | 7/1963 | Jett | 221/190 |
| 3,581,954 | 6/1971 | Prentice | 222/361 |
| 4,218,981 | 8/1980 | Kelly | 111/89 |

*Primary Examiner*—Spencer K. Warnick, IV
*Attorney, Agent, or Firm*—Walker, McKenzie & Walker

[57] ABSTRACT

A garden seeder having a seed hopper atop an elongated barrel, a seed dispenser for dispensing a metered volume of seeds from the hopper into the barrel, a resting plate secured transversely to the bottom of the barrel for resting placement upon the ground, and a seed dispensing foot below the resting plate. The resting plate includes a hoe blade portion extending outwardly from the barrel. Seeds pass down the barrel from the seed dispenser, out the dispensing foot, and into the ground. A measurement arm may extend outwardly from the lower end of the barrel to space newly-planted seeds from previously-planted hills. The seed dispenser includes a sliding plate having interchangeable metering insert plugs that are removably inserted into a seed metering hole in the sliding plate, so as to define a selectable metered volume of seeds to be dispensed with each operation of the seed dispenser.

13 Claims, 2 Drawing Sheets

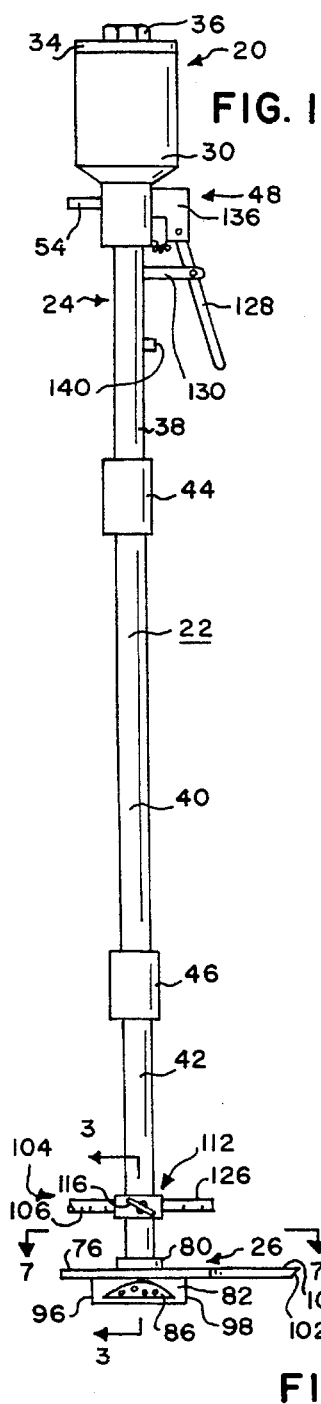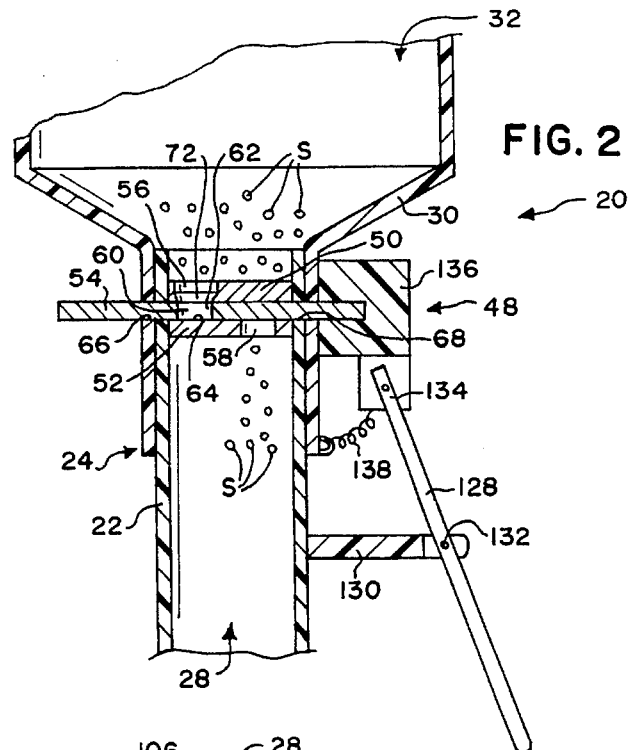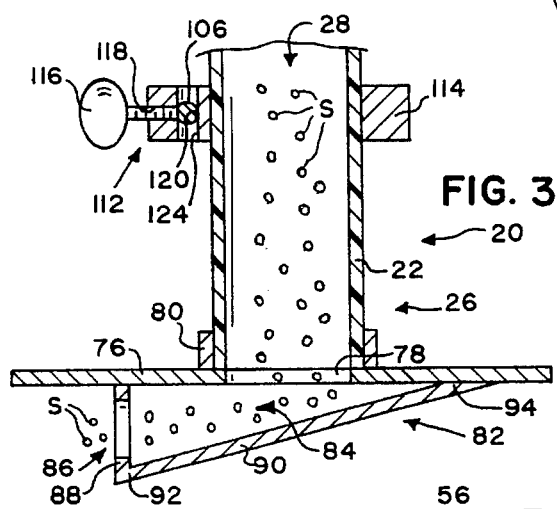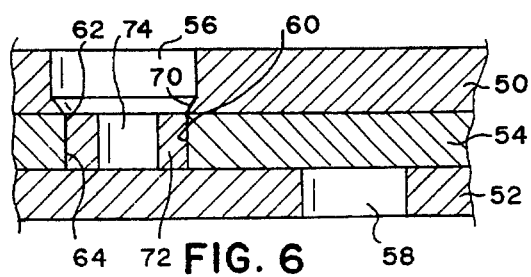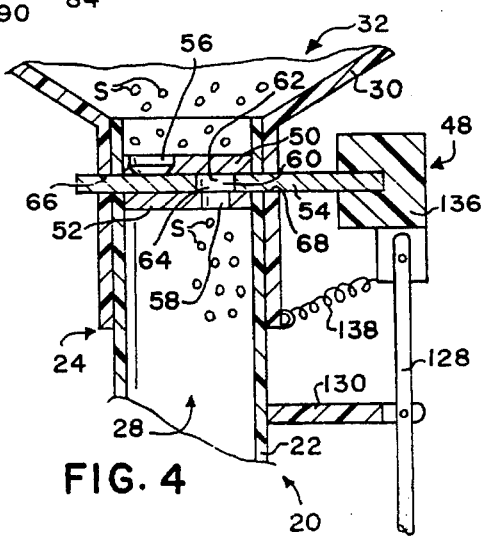

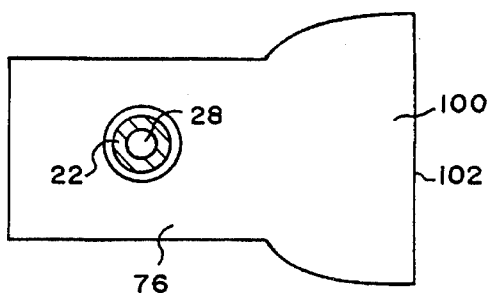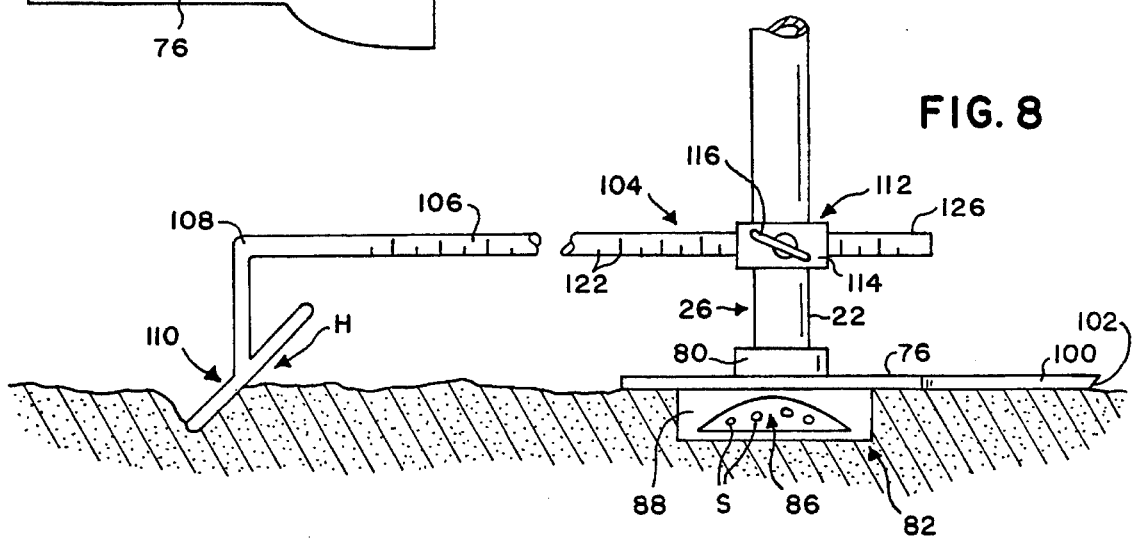

GARDEN SEEDER

BACKGROUND OF THE INVENTION

1. Field of the Invention

The present invention relates, in general, to agricultural implements, and in particular, to a manually-operated seed dispenser for depositing a predetermined number of seeds into the ground.

2. Information Disclosure Statement

A problem faced by home gardeners is the great amount of back-breaking manual labor required to plant their gardens with seeds such as, for example, corn, beans, peas, and the like. Well-known planting implements include hoes, shovels, trowels, and the like, whose use requires frequent and extended periods of stooping and kneeling. Such effort is difficult if not impossible for elderly or disabled gardeners, who are thus prevented from obtaining the satisfaction, enjoyment, and benefit of planting a garden and harvesting the resulting food and/or creating a beautiful display of flowering plants.

The manual planting of seeds, besides heretofore being strenuous and difficult, typically produces a wide variance in the volume of seeds planted at each planting position along a row, and it is difficult to plant successive hills at fixed distances from one another.

It is therefore desirable to have a garden seeder that allows a selectable metered volume of seeds to be planted, from a standing position of the gardener, in a succession of planting positions along a planting row or furrow, spaced a predetermined distance from a previously-planted hill of seeds. It is additionally desirable that such a garden seeder provide means for creating a depression into the soil for holding the metered volume of seeds, and also provide means for covering the seeds with earth after deposit in the depression, also from a standing position of the gardener.

A preliminary patentability search in Class 111, subclasses 82, 92 and 98, produced the following patents, some of which may be relevant to the present invention: Riordan, U.S. Pat. No. 1,094,595, issued Apr. 28, 1914; Kollenberg, U.S. Pat. No. 1,182,913, issued May 16, 1916, Gourlay, U.S. Pat. No. 1,610,767, issued Dec. 14, 1926; Jett, U.S. Pat. No. 3,097,759, issued Jul. 16, 1963; and Kelly, U.S. Pat. No. 4,218,981, issued Aug. 26, 1980. None of these patents disclose or suggest the present invention.

SUMMARY OF THE INVENTION

The present invention is a garden seeder having a seed hopper atop an elongated barrel, seed dispensing means for dispensing a metered volume of seeds from the hopper into the barrel, a resting plate secured transversely to the bottom of the barrel for resting placement upon the ground, and a seed dispensing foot below the resting plate. Seeds pass down the barrel from the seed dispensing means, out the dispensing foot, and into the ground. A measurement arm may extend outwardly from the lower end of the barrel to space newly-planted seeds from previously-planted hills. The resting plate may include a hoe blade portion extending outwardly from the barrel. The seed dispensing means includes a sliding plate preferably having interchangeable metering insert plugs that are removably inserted into a seed metering hole in the sliding plate, so as to define a selectable metered volume of seeds to be dispensed with each operation of the seed dispensing means.

It is an object of the present invention to provide means for planting a selectable metered volume of seeds, from a gardener's standing position, along a planting row a predetermined distance from a previously-planted hill of seeds. It is a further object of the invention to provide means for covering the seeds after their deposit in a depression in the earth, also from a standing position of the gardener.

BRIEF DESCRIPTION OF THE DRAWINGS

FIG. 1 is a partial side view of the present invention, showing the various parts thereof.

FIG. 2 is a partial sectional view of the present invention showing the seed dispensing means, with the sliding plate shown in a first position.

FIG. 3 is a partial sectional view of the present invention showing the dispensing foot and the adjustable mounting means for the measurement arm, taken substantially along the line 3—3 shown in FIG. 1.

FIG. 4 is a partial sectional view of the present invention showing the seed dispensing means, similar to FIG. 2 but with the sliding plate shown in a second position.

FIG. 5 is a perspective view of a seed metering insert of the present invention.

FIG. 6 is a partial side sectional view of the seed dispensing means of the present invention, showing use of the seed metering insert.

FIG. 7 is a top plan view of the dispensing foot of the present invention showing the hoe blade, taken substantially along the line 7—7 shown in FIG. 1.

FIG. 8 is a partial side view of the dispensing foot of the present invention, showing the hill marker arm and the adjustable mounting means for the measurement arm.

DESCRIPTION OF THE PREFERRED EMBODIMENT

Referring to FIGS. 1–8, garden seeder 20 is seen to comprise an elongated barrel 22 having an upper end 24 and a lower end 26, with barrel 22 having an internal bore 28 therethrough, preferably of uniform diameter, from upper end 24 to lower end 26. Atop barrel 22 at upper end 24 is a seed hopper 30 for holding a quantity of seeds S, with seed hopper 30 having an interior 32 and preferably having a sealing cap 34 threadedly or frictionally secured to seed hopper 30 in a manner well-known to those skilled in the art. Preferably, sealing cap 34 may have a knob 36 extending axially and upwardly therefrom for facilitating the removal and replacement of sealing cap 34 with respect to seed hopper 30 as hopper 30 is replenished with seeds. To facilitate shipping and storage, barrel 22 is preferably constructed of a plurality of sections, e.g., sections 38, 40, and 42 as shown, with adjacent sections being joined as by internally-threaded or frictionally-fitted sleeves 44 and 46, or other equivalent and well-known methods of joining, in a manner well-known to those skilled in the art.

Garden seeder 20 further comprises seed dispensing means 48, interposed between the interior 32 of seed hopper 30 and bore 28, for dispensing a metered volume of seeds from the interior 32 of seed hopper 30 into bore 28. Seed dispensing means 48 is seen to comprise an upper blocking plate 50 spanning bore 28, a lower blocking plate 52 spanning bore 28, and a sliding plate 54 sandwiched between upper blocking plate 50 and lower blocking plate 52 and secured for slidable movement therebetween.

Upper blocking plate 50 is seen to have a seed collection hole 56 therethrough for accumulation of seeds from hopper 30 and for passage of seeds through upper blocking plate 50 from the interior 32 of hopper 30.

Lower blocking plate 52 is seen to have a seed dispensing hole 58 therethrough for passage of seeds therethrough and into bore 28, with seed dispensing hole 58 being horizontally offset from seed collection hole 56 and in complete vertical non-alignment therewith.

Sliding plate 54 is seen to have a seed metering hole 60 therethrough with seed metering hole 60 having an upper end 62 and having a lower end 64. Preferably, sliding plate 54 is slidably received directly beneath hopper 30 into opposing slots 66 and 68 through opposite sides of barrel 22 as shown. Thus mounted, sliding plate 54 is slidable between: a first position, shown in FIG. 2, in which upper end 62 of seed metering hole 60 is in substantial alignment with seed collection hole 56 and lower end 64 of seed metering hole 60 is blocked by lower blocking plate 52, thereby allowing a metered volume of seeds to accumulate within seed metering hole 60; and a second position, shown in FIG. 4, in which upper end 62 of seed metering hole 60 is blocked by upper blocking plate 50 and lower end 64 of seed metering hole 60 is in substantial alignment with seed dispensing hole 58, thereby allowing the metered volume of seeds to fall downwardly by gravity through seed dispensing hole 58 into bore 28 and toward lower end 26 of barrel 22.

Seed collection hole 56 may have a funnel-shaped lower portion 70 as shown with a constricted diameter, for directing seeds into seed metering hole 60.

To selectively determine the metered volume of seeds dispensed by garden seeder 20 upon each actuation of seed dispensing means 48, a seed metering bushing or insert plug 72 shown in FIG. 5 may be removably and closely received within seed metering hole 60 as shown in FIG. 6. Metering insert 72 is seen to have a longitudinal hole 74 therethrough and defining the metered volume of seeds to be dispensed by seed dispensing means 48. It shall now be understood that metering insert 72 constricts seed metering hole 60 and reduces the metered volume of seed metering hole 60 that may be filled with seeds from hopper 30.

A plurality of such metering inserts 72 are preferably provided together with garden seeder 20, each such insert having a different transverse cross-sectional area for its longitudinal hole 74 through the selectable metering insert. For example, metering insert 72 may be selected from the group consisting of: a first insert plug in which the longitudinal hole there through has a first transverse cross-sectional area; a second insert plug in which the longitudinal hole therethrough has a second transverse cross-sectional area larger than the first transverse cross-sectional area of the first insert plug; and a third insert plug in which the longitudinal hole there through has a third transverse cross-sectional area intermediate to the first and second transverse cross-sectional areas of the first and second insert plugs, respectively. Each insert plug is understood to have the same outer dimensions for close fitting and removable insertion into seed metering hole 60, as shown, for example, in FIG. 6. To identify and differentiate the various insert plugs, each may have various distinguishing indicia thereon or preferably the insert plugs will be color coded, each insert plug having a different distinguishing color for easy identification, each corresponding to different types and sizes of seeds and metered volume of the dispensed seeds.

Referring to FIGS. 1, 3, 7, and 8, garden seeder 20 also preferably and additionally comprises a resting plate 76, secured substantially transversely to lower end 26 of barrel 22, for abutting placement upon the ground, with resting plate 76 having an opening 78 therethrough in alignment with bore 28. For rigidity and support, resting plate 76 may have a collar 80 secured both to resting plate 76 and barrel 22 as shown. Garden seeder 20 also preferably includes a dispensing foot 82 secured to the underside of resting plate 76. Dispensing foot 82 has a chamber 84 therewithin in communication with bore 28 through opening 78, and dispensing foot 82 has an egress hole 86, preferably arch-shaped as shown, in communication with chamber 84. Seeds S are now understood to pass from bore 28, through opening 78 and into chamber 84, and then out egress hole 86.

Dispensing foot 82 preferably is constructed having an upright sidewall 88 substantially perpendicular to resting plate 76 and affixed thereto, with egress hole 86 being through sidewall 88, and dispensing foot 82 further includes an angled bottom plate 90 having a first end 92 sealingly attached to upright sidewall 88 remote from resting plate 76 and having a second end 94 sealingly secured to resting plate 76 as shown. Dispensing foot 82 preferably has open left and right ends 96 and 98, allowing easy cleaning of dispensing foot 82 if necessary. Thus constructed, dispensing foot 82 is seen to be open on its vertical sides and one end, yet is closed and angled on the bottom, thus inhibiting the clogging of dispensing foot 82 with dirt as dispensing foot 82 is placed on and into the ground, yet, at the same time, urging, because of the angled construction of bottom plate 90, seeds to exit from chamber 84. The angled construction of bottom plate 90 further is understood to create a depression in the soil beneath resting plate 76 as resting plate 76 is placed upon the ground so that the depression may receive seeds dispensed from garden seeder 20.

To cover the seeds with soil and tamp the soil after the seeds have been deposited in the ground, garden seeder 20 further includes a hoe blade portion 100 of resting plate 76, extending outwardly from barrel 22 as shown. If desired, the outer edge 102 of hoe blade portion 100 may be sharpened to more easily cut into the ground.

Referring to FIGS. 1 and 8, garden seeder 20 also preferably includes measurement means 104 for spacing the lower end 26 of barrel 22 a predetermined distance from a previously planted hill H of seeds. Measurement means 104 is seen to include an arm 106 extending outwardly from the lower end 26 of barrel 22, with arm 106 having a distal end 108 with an angled pointer 110 thereupon for alignment with the previously planted hill of seeds. Measurement means 104 further includes adjustable mounting means 112 for adjustably mounting arm 106 to barrel 22 so that distal end 108 extends the desired predetermined distance outwardly from barrel 22. Preferably, as shown in FIG. 3, adjustable mounting means 112 comprises a collar 114 fixedly attached to barrel 22 and having a bolt or preferably a thumbscrew 116 threadedly received into a hole 118, with hole 118 extending radially from barrel 22 and perpendicularly intersecting a second horizontal hole 120 through collar 114 so as to entrap and secure arm 106 when arm 106 is inserted through hole 120 as shown. Arm 106 may have calibrated indicia 122 thereon for determining the predetermined distance between successive hills of seeds. For convenience in storing arm 106 when garden seeder 20 is not in use, collar 114 may also have a third vertical hole 124 intersecting hole 118 and parallel to the axis of barrel 22. During storage, proximal end 126 of arm 106 may be inserted through hole 124 and secured therewithin by thumbscrew 116 in a manner that will now be understood. If desired, a plurality of arms 106 may be provided, each of different lengths, and adjustable mounting means 112 can be used to precisely adjust the particular chosen arm 106 for the desired inter-hill distance.

Referring to FIGS. 1, 2, and 4, seed dispensing means 48 additionally comprises a lever arm 128 attached to barrel 22, as upon outwardly-extending support 130, at a fulcrum or pin 132 for pivotal movement thereabout. Lever arm 128 is seen to be attached at a first end 134, as by intervening attachment block 136, to sliding plate 54 for horizontal movement of sliding plate 54 between its first and second positions, previously described, respectively shown in FIGS. 2 and 4. Dispensing means 48 further comprises spring restoring means, such as spring 138 between barrel 22 and attachment block 136, for urging sliding plate 54 into its first position. Barrel 22 may also have a resting stop 140 for limiting the motion of lever arm 128.

Preferably garden seeder 20 is constructed of a lightweight yet durable material such as plastic or a lightweight metal.

To use garden seeder 20, a gardener selects a desired metering insert 72 from the various insert plugs so as to give a desired metered volume of seeds, and places the insert 72 into seed metering hole 60 within sliding plate 54. The gardener then fills hopper 30 with seeds and adjusts arm 106 for the desired inter-hill planting distance. The gardener then rests plate 76 upon the previously-tilled ground using arm 106 to space barrel 22 from a previously-planted hill of seeds, causing dispensing foot 82 to create a depression in the soil. The gardener then actuates lever arm 128 using his or her hand to dispense seeds from hopper 30. A metered volume of seeds will then fall down barrel 22 into chamber 84 within dispensing foot 82, and, when garden seeder 20 is lifted from the ground, the seeds will emerge through egress hole 86 and remain in the depression in the soil. Hoe blade portion 100 can then be used to cover the seeds and tamp the soil. This process is repeated at successive planting positions in a manner that will now be apparent to those skilled in the art.

Although the present invention has been described and illustrated with respect to a preferred embodiment and a preferred use therefor, it is not to be so limited since modifications and changes can be made therein which are within the full intended scope of the invention.

We claim:

1. A garden seeder, said garden seeder comprising:
  (a) an elongated barrel having an upper end and a lower end, said barrel having an internal bore therethrough extending to said lower end of said barrel;
  (b) a seed hopper for holding a quantity of seeds, said seed hopper having an interior;
  (c) seed dispensing means, interposed between the interior of said seed hopper and said bore, for dispensing a metered volume of seeds from the interior of said hopper into said bore, said seed dispensing means comprising:
    i. an upper blocking plate spanning said bore, said upper blocking plate having a seed collection hole therethrough for passage of seeds therethrough from the interior of said hopper;
    ii. a lower blocking plate spanning said bore, said lower blocking plate having a seed dispensing hole therethrough for passage of seeds therethrough and into said bore, said seed dispensing hole being horizontally offset from said seed collection hole and in complete vertical non-alignment therewith;
    iii. a sliding plate sandwiched between said upper blocking plate and said lower blocking plate and secured for slidable movement therebetween, said sliding plate having a seed metering hole therethrough with said seed metering hole having an upper end and having a lower end, with said sliding plate being slidable between:
      A. a first position, in which said upper end of said seed metering hole is in substantial alignment with said seed collection hole and said lower end of said seed metering hole is blocked by said lower blocking plate, thereby allowing said metered volume of seeds to accumulate within said seed metering hole; and
      B. a second position, in which said upper end of said seed metering hole is blocked by said upper blocking plate and said lower end of said seed metering hole is in substantial alignment with said seed dispensing hole, thereby allowing said metered volume of seeds to fall downwardly through said seed dispensing hole into said bore and toward said lower end of said barrel; and
    iv. a metering insert removably and closely received within said seed metering hole, said metering insert having a longitudinal hole therethrough and defining said metered volume;
  (d) a resting plate, secured substantially transversely to said lower end of said barrel, for abutting placement upon the ground, said resting plate having an opening therethrough in alignment with said bore; and
  (e) a dispensing foot secured to said resting plate on the underside thereof, said dispensing foot having a chamber therewithin in communication with said bore through said opening, and said dispensing foot having an egress hole therethrough in communication with said chamber within said dispensing foot.

2. The garden seeder as recited in claim 1, in which said dispensing foot includes an upright sidewall substantially perpendicular to said resting plate, with said egress hole being through said upright sidewall, and further in which said dispensing foot includes an angled bottom plate having a first end attached to said upright sidewall remote from said resting plate and said angled bottom plate having a second end attached to said resting plate.

3. The garden seeder as recited in claim 2, in which said resting plate includes a hoe blade portion extending outwardly from said barrel.

4. A garden seeder, said garden seeder comprising:
  (a) an elongated barrel having an upper end and a lower end, said barrel having an internal bore therethrough extending to said lower end of said barrel;
  (b) a seed hopper for holding a quantity of seeds, said seed hopper having an interior;
  (c) seed dispensing means, interposed between the interior of said seed hopper and said bore, for dispensing a metered volume of seeds from the interior of said hopper into said bore, said seed dispensing means comprising:
    i. an upper blocking plate spanning said bore, said upper blocking plate having a seed collection hole therethrough for passage of seeds therethrough from the interior of said hopper;
    ii. a lower blocking plate spanning said bore, said lower blocking plate having a seed dispensing hole therethrough for passage of seeds there through and into said bore, said seed dispensing hole being horizontally offset from said seed collection hole and in complete vertical non-alignment therewith;

iii. a sliding plate sandwiched between said upper blocking plate and said lower blocking plate and secured for slidable movement therebetween, said sliding plate having a seed metering hole therethrough with said seed metering hole having an upper end and having a lower end, with said sliding plate being slidable between:

A. a first position, in which said upper end of said seed metering hole is in substantial alignment with said seed collection hole and said lower end of said seed metering hole is blocked by said lower blocking plate, thereby allowing said metered volume of seeds to accumulate within said seed metering hole; and B. a second position, in which said upper end of said seed metering hole is blocked by said upper blocking plate and said lower end of said seed metering hole is in substantial alignment with said seed dispensing hole, thereby allowing said metered volume of seeds to fall downwardly through said seed dispensing hole into said bore and toward said lower end of said barrel; and iv. a metering insert removably and closely received within said seed metering hole, said metering insert having a longitudinal hole therethrough and defining said metered volume;

(d) a resting plate, secured substantially transversely to said lower end of said barrel, for abutting placement upon the ground, said resting plate having an opening therethrough in alignment with said bore, said resting plate including a hoe blade portion extending outwardly from said barrel;

(e) a dispensing foot secured to said resting plate on the underside thereof, said dispensing foot having a chamber therewithin in communication with said bore through said opening, and said dispensing foot having an egress hole therethrough in communication with said chamber within said dispensing foot;

(f) measurement means for spacing the lower end of said barrel a predetermined distance from a previously-planted hill of seeds, said measurement means comprising:

i. an arm extending outwardly from said lower end of said barrel, said arm having a distal end remote from said barrel; and ii. adjustable mounting means for adjustably mounting said arm to said barrel so that said distal end extends said predetermined distance from said barrel.

5. The garden seeder as recited in claim 4, in which said dispensing foot includes an upright sidewall substantially perpendicular to said resting plate, with said egress hole being through said upright sidewall, and further in which said dispensing foot includes an angled bottom plate having a first end attached to said upright sidewall remote from said resting plate and said angled bottom plate having a second end attached to said resting plate.

6. The garden seeder as recited in claim 4, in which said seed dispensing means additionally comprises:

(a) a lever arm pivotally attached to said barrel at a fulcrum for pivotal movement thereabout, said lever arm being attached at a first end to said sliding plate for movement of said sliding plate as said lever arm moves about said fulcrum; and (b) spring restoring means for urging said sliding plate into said first position.

7. The garden seeder as recited in claim 6, in which said dispensing foot includes an upright sidewall substantially perpendicular to said resting plate, with said egress hole being through said upright sidewall, and further in which said dispensing foot includes an angled bottom plate having a first end attached to said upright sidewall remote from said resting plate and said angled bottom plate having a second end attached to said resting plate.

8. The garden seeder as recited in claim 4, in which said metering insert is selected from the group consisting of:

(a) a first insert plug, said longitudinal hole therethrough having a first transverse cross-sectional area;

(b) a second insert plug, said longitudinal hole therethrough having a second transverse cross-sectional area larger than said first transverse cross-sectional area; and (c) a third insert plug, said longitudinal hole therethrough having a third transverse cross-sectional area intermediate to said first and said second transverse cross-sectional areas.

9. The garden seeder as recited in claim 8, in which said seed dispensing means additionally comprises:

(a) a lever arm pivotally attached to said barrel at a fulcrum for pivotal movement thereabout, said lever arm being attached at a first end to said sliding plate for movement of said sliding plate as said lever arm moves about said fulcrum; and (b) spring restoring means for urging said sliding plate into said first position.

10. The garden seeder as recited in claim 9, in which said dispensing foot includes an upright sidewall substantially perpendicular to said resting plate, with said egress hole being through said upright sidewall, and further in which said dispensing foot includes an angled bottom plate having a first end attached to said upright sidewall remote from said resting plate and said angled bottom plate having a second end attached to said resting plate.

11. A garden seeder, said garden seeder comprising:

(a) an elongated barrel having an upper end and a lower end, said barrel having an internal bore therethrough extending to said lower end of said barrel;

(b) a seed hopper for holding a quantity of seeds, said seed hopper having an interior;

(c) seed dispensing means, interposed between the interior of said seed hopper and said bore, for dispensing a metered volume of seeds from the interior of said hopper into said bore, said seed dispensing means comprising:

i. an upper blocking plate spanning said bore, said upper blocking plate having a seed collection hole therethrough for passage of seeds therethrough from the interior of said hopper;

ii. a lower blocking plate spanning said bore, said lower blocking plate having a seed dispensing hole therethrough for passage of seeds therethrough and into said bore, said seed dispensing hole being horizontally offset from said seed collection hole and in complete vertical non-alignment therewith;

iii. a sliding plate sandwiched between said upper blocking plate and said lower blocking plate and secured for slidable movement therebetween, said sliding plate having a seed metering hole therethrough with said seed metering hole having an upper end and having a lower end, with said sliding plate being slidable between:

A. a first position, in which said upper end of said seed metering hole is in substantial alignment with said seed collection hole and said lower end of said seed metering hole is blocked by said lower blocking plate, thereby allowing said metered volume of seeds to accumulate within said seed metering hole; and B. a second position, in which said upper end of said seed metering hole is blocked by said upper blocking plate and said lower end of said seed metering hole is in substantial alignment with said seed dispensing hole, thereby allowing said metered volume of seeds to fall downwardly through said seed dispensing hole into said bore and toward said lower end of said barrel;

(d) a resting plate, secured substantially transversely to said lower end of said barrel, for abutting placement upon the ground, said resting plate having an opening therethrough in alignment with said bore; and (e) a dispensing foot secured to said resting plate on the underside thereof, said dispensing foot having a chamber therewithin in communication with said bore through said opening, and said dispensing foot having an egress hole therethrough in communication with said chamber within said dispensing foot.

12. The garden seeder as recited in claim 11, in which said dispensing foot includes an upright sidewall substantially perpendicular to said resting plate, with said egress hole being through said upright sidewall, and further in which said dispensing foot includes an angled bottom plate having a first end attached to said upright sidewall remote from said resting plate and said angled bottom plate having a second end attached to said resting plate.

13. The garden seeder as recited in claim 11, in which said resting plate includes a hoe blade portion extending outwardly from said barrel.

* * * * *